(12) United States Patent
Kamigaito

(10) Patent No.: US 9,579,846 B2
(45) Date of Patent: Feb. 28, 2017

(54) LATERAL SEALING DEVICE OF PACKAGING MACHINE

(75) Inventor: Satoru Kamigaito, Omihachiman (JP)

(73) Assignee: ISHIDA CO., LTD., Kyoto (JP)

(*) Notice: Subject to any disclaimer, the term of this patent is extended or adjusted under 35 U.S.C. 154(b) by 732 days.

(21) Appl. No.: 13/469,734

(22) Filed: May 11, 2012

(65) Prior Publication Data

US 2012/0285130 A1 Nov. 15, 2012

(30) Foreign Application Priority Data

| May 11, 2011 | (JP) | 2011-106038 |
| May 11, 2011 | (JP) | 2011-106040 |
| Mar. 7, 2012 | (JP) | 2012-050610 |

(51) Int. Cl.
*B29C 65/00* (2006.01)
*B29C 65/08* (2006.01)
(Continued)

(52) U.S. Cl.
CPC ........ *B29C 65/087* (2013.01); *B29C 65/7451* (2013.01); *B29C 66/1122* (2013.01);
(Continued)

(58) Field of Classification Search
CPC ... B29C 65/08; B29C 65/087; B29C 65/7443; B29C 66/81463; B29C 66/81469; B29C 66/816; B65B 51/225; B65B 51/306
(Continued)

(56) References Cited

U.S. PATENT DOCUMENTS 3,845,332 A * 10/1974 Last ............................... 310/325
4,750,955 A * 6/1988 Haguenier .............. B29C 65/08
156/216
(Continued)

FOREIGN PATENT DOCUMENTS

| JP | 63-78493 A | 4/1988 |
| JP | 2000-203531 A | 7/2000 |

(Continued)

OTHER PUBLICATIONS

Patent Examination Report No. 1 of the corresponding Australian Patent Application No. 2012202771, dated dated Nov. 6, 2014.
(Continued)

*Primary Examiner* — Andrew M Tecco
*Assistant Examiner* — Chelsea Stinson
(74) *Attorney, Agent, or Firm* — Global IP Counselors, LLP

(57) ABSTRACT

In a lateral sealing mechanism, a cylindrical film is sandwiched and ultrasonic sealing is performed along a direction that intersects a conveying direction while a first horn and a first anvil, and a second horn and a second anvil rotate. The first horn is mounted on a first rotating body in a state of being coupled to a plurality of vibrating elements. The second horn is mounted on the second rotating body in a state coupled to a plurality of vibrating elements. A securing member grips a horn unit, which includes the horns and the plurality of vibrating elements, on the forward and rearward sides in the direction of rotation of the horn assembly in the vicinity of the node of ultrasonic vibration and secures the horn unit to the first rotating body and the second rotating body, respectively.

12 Claims, 11 Drawing Sheets

(51) Int. Cl.
*B65B 51/22* (2006.01)
*B65B 51/30* (2006.01)
*B29C 65/74* (2006.01)
*B65B 9/207* (2012.01)

(52) U.S. Cl.
CPC ...... *B29C 66/4312* (2013.01); *B29C 66/8145* (2013.01); *B29C 66/8167* (2013.01); *B29C 66/81431* (2013.01); *B29C 66/81463* (2013.01); *B29C 66/83513* (2013.01); *B29C 66/849* (2013.01); *B65B 51/225* (2013.01); *B65B 51/306* (2013.01); *B29C 66/4322* (2013.01); *B65B 9/207* (2013.01)

(58) Field of Classification Search
USPC ........... 53/374.4, 373.2, 450, 451, 476, 477; 156/73.1, 73.5, 73.6, 580.1, 580.2
See application file for complete search history.

(56) References Cited

U.S. PATENT DOCUMENTS

| | | | | |
|---|---|---|---|---|
| 5,642,606 | A | * | 7/1997 | Ohlsson ................ B29C 65/08 156/580.2 |
| 5,828,156 | A | * | 10/1998 | Roberts ........................ 310/317 |
| 6,368,437 | B1 | * | 4/2002 | Ziegelhoffer et al. ....... 156/73.1 |
| 7,325,373 | B2 | * | 2/2008 | Boldrini et al. ............. 53/374.4 |
| 7,328,544 | B2 | * | 2/2008 | Yokota .................... B65B 9/207 53/167 |
| 7,658,053 | B2 | * | 2/2010 | Honegger ............... B29C 65/02 53/374.5 |
| 8,943,782 | B2 | * | 2/2015 | Dax ........................ B29C 65/02 53/374.4 |
| 2010/0104970 | A1 | * | 4/2010 | Norikane ............. G03G 9/0819 430/137.14 |
| 2010/0116409 | A1 | * | 5/2010 | Yamamoto ........ A61F 13/15699 156/73.1 |

FOREIGN PATENT DOCUMENTS

| | | |
|---|---|---|
| JP | 2001-212513 A | 8/2001 |
| JP | 4147309 B | 9/2008 |
| JP | 2009-502671 A | 1/2009 |
| WO | WO-2007-012917 A1 | 2/2007 |

OTHER PUBLICATIONS

Office Action of the corresponding Japanese Patent Application No. 2012-050610, dated Jan. 5, 2016.

* cited by examiner

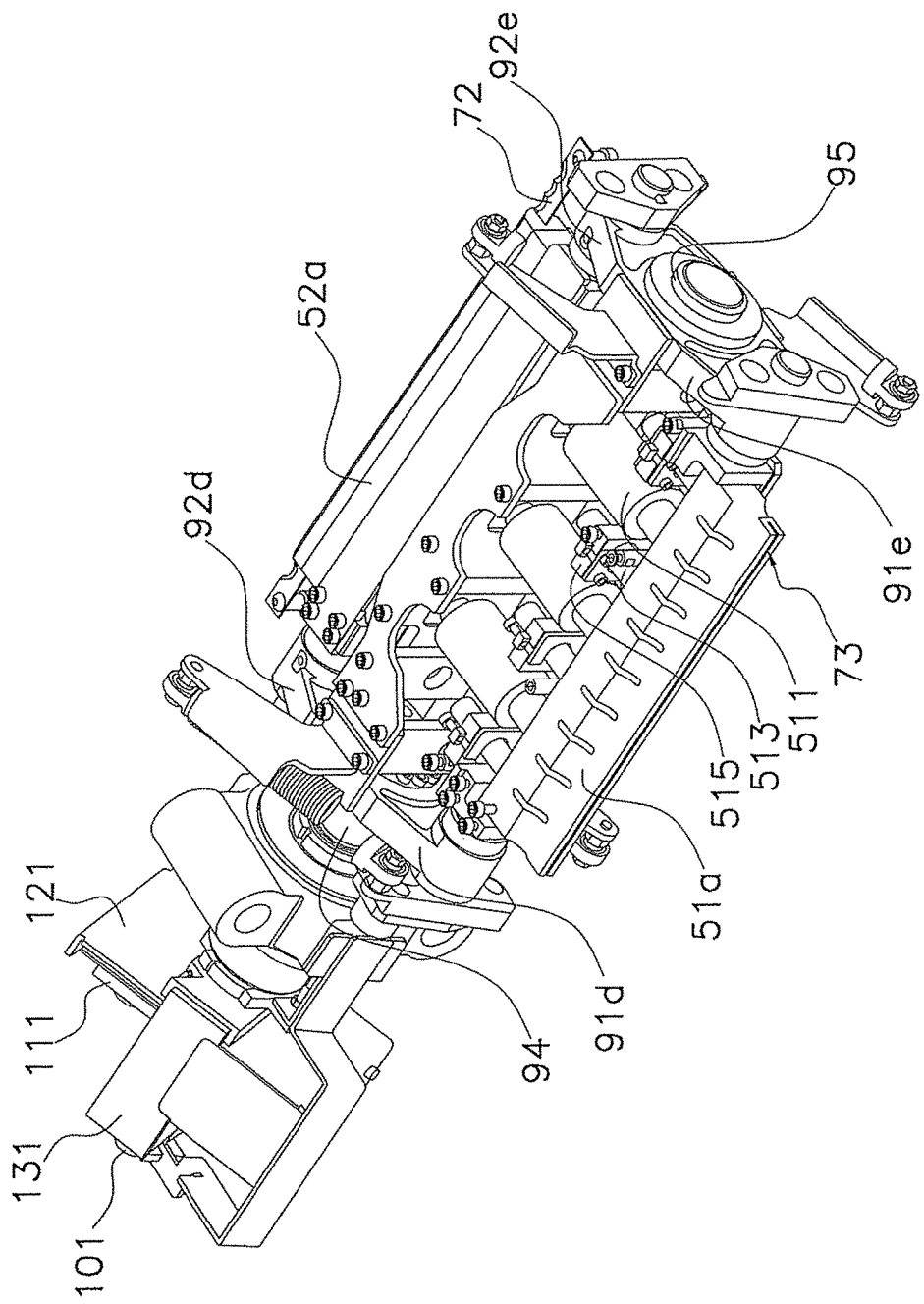
F I G. 6

LATERAL SEALING DEVICE OF PACKAGING MACHINE

TECHNICAL FIELD

The present invention relates to a lateral sealing device of a packaging machine, and particularly relates to a lateral sealing device of a packaging machine in which conveyed packaging material is formed into a cylindrical shape, the package is filled with the items to be packaged, and the package is then laterally sealed by an ultrasonic sealing mechanism.

BACKGROUND ART

A sealing device for laterally sealing packaging material using an ultrasonic sealing mechanism is disclosed in WO2007/012917A1. In this sealing device, an ultrasonic horn and anvil are mounted on each of a pair of rotating bodies, and a cylindrical packaging material is sandwiched and ultrasonically sealed along a direction orthogonal to the conveying direction thereof while the horn and anvil are rotated.

In such an ultrasonic sealing scheme, it is important that the horn be stably driven, but no mention is made of this point in WO2007/012917A1.

Conversely, the ultrasonic sealing device disclosed in Japanese Patent No. 4147309 obtains stable driving of the horn by securing the horn assembly to the moving body in the vicinity of a node of the ultrasonic vibration.

SUMMARY OF THE INVENTION

The ultrasonic sealing device disclosed in Japanese Patent No. 4147309 has a configuration in which the horn is supported in a cantilever fashion from the side on which the vibrating element is arranged. Therefore, space for securing the horn is required further rearward from the vibrating element, and were this configuration to be used in a rotating-type lateral sealing device, the rotational diameter would be greater and the size of the device would be greater overall.

An object of the present invention is to provide a lateral sealing device of a packaging machine that uses an ultrasonic sealing scheme and that minimizes an increase in size.

A plurality of vibrating elements are coupled to the horn side among the rotating horn and anvil, and power must be fed to the vibrating elements from the non-rotating side. Therefore, a second object of the present invention is to provide a lateral sealing device of a packaging machine with feed power to the two poles of each of plurality of vibrating elements from the non-rotating side using a low-cost method.

Solution to Problem

A lateral sealing device of a packaging machine according to a first aspect of the present invention is a lateral sealing device of a packaging machine for sandwiching and laterally sealing a packaging material along a direction intersecting a conveying direction. The lateral sealing device of a packaging machine includes a pair of rotating bodies. Each of the rotating bodies includes a horn assembly and an anvil. The horn assembly includes a horn and a plurality of vibrating elements. Each of the rotating bodies is rotatable about a rotation axis, each rotating body having a forward side and a reverse side relative to a direction of rotation about the rotation axis. A securing member grips the horn assembly at the forward side and the reverse side thereof, securing the horn assembly to the rotating members. The securing member is arranged in the vicinity of a node of ultrasonic vibration of the horn assembly.

According to the lateral sealing device of the aspect described above, the space occupied by the securing member behind the vibrating elements is small, and an increase in the size of the device is minimized because the horn assembly is gripped on two sides, which are the forward side and the reverse side of the direction of rotation, by the securing member to secure the horn assembly to the rotating members.

A lateral sealing device of a packaging machine according to a second aspect of the present invention is the lateral sealing device of a packaging machine according to the first aspect of the present invention, wherein the securing member has: a resonator, a holding part, and a securing part. The resonator is adjacent to the two sides of the vibrating elements and coupled to the horn. The holding part holds the resonator. The securing part secures the holding part.

A lateral sealing device of a packaging machine according to a third aspect of the present invention is the lateral sealing device of a packaging machine according to the second aspect of the present invention, wherein a flange is provided to an external periphery of the resonator. The holding part sandwiches and holds the flange.

A lateral sealing device of a packaging machine according to a fourth aspect of the present invention is the lateral sealing device of a packaging machine according to the third aspect of the present invention, wherein the flange and the holding part are fastened together interposed by a packing.

A lateral sealing device of a packaging machine according to a fifth aspect of the present invention is the lateral sealing device of a packaging machine according to the first aspect of the present invention, wherein the securing member is arranged in the vicinity of one of the two nodes of the ultrasonic vibration of the horn assembly.

According to the lateral sealing device of the aspect described above, the device can therefore be made smaller because the securing member does not protrude rearward from the vibrating elements in the case that the securing member is arranged at a node on the side near the seal face.

A lateral sealing device of a packaging machine according to a sixth aspect of the present invention is the lateral sealing device of a packaging machine according to the first aspect of the present invention, wherein the horn and the anvil approach each other while spinning, and progress in a rectilinear fashion from a position in which the packaging material is sandwiched along the direction of spin while the packaging material remains sandwiched, whereby the packaging material is laterally sealed, and thereafter spin in a direction away from each other.

According to the lateral sealing device of the aspect described above, a constant sealing time can be ensured and sealing can be reliably carried out because the horn and anvil perform lateral sealing in the interval of rectilinear progression.

A lateral sealing device of a packaging machine according to a seventh aspect of the present invention is the lateral sealing device of a packaging machine according to the sixth aspect of the present invention, wherein the horn and the anvil are mounted on the rotating body interposed by a swinging mechanism in which swinging at a predetermined angle is allowed ahead and behind in the direction of progress in an interval of rectilinear progression.

According to the lateral sealing device of the aspect described above, the movement of the horn and anvil is a so-called D motion in which the movement is changed from a spinning movement to a rectilinear movement at the point at which the packaging material begins to be sandwiched, and is changed from rectilinear movement to spinning movement at the point at which the horn and anvil move away from the packaging material. Therefore, swinging is allowed, whereby the sealing face of the horn and anvil can constitute a flat surface. In other words, the sealing face is not required to be an arcuate shape in the manner of the horn and anvil described in WO2007/012917A1.

A lateral sealing device of a packaging machine according to an eighth aspect of the present invention is the lateral sealing device of a packaging machine according to the seventh aspect of the present invention, wherein a rear end of the horn assembly is positioned further behind the rotating shaft of the rotating body. A space for allowing the swinging of the rear end of the horn that accompanies the swinging of the horn is provided to a periphery of the rear end of the horn assembly.

According to the lateral sealing device of the aspect described above, the swinging of the horn during lateral sealing is amplified at the rear end of the horn assembly, and space sufficient to allow the swinging thereof is ensured. Therefore, interference with other locations is prevented.

A lateral sealing device of a packaging machine according to a ninth aspect of the present invention is a lateral sealing device of a packaging machine for sandwiching and laterally sealing a packaging material along a direction intersecting a conveying direction while an ultrasonic sealing horn and an anvil spin, the lateral sealing device of a packaging machine comprising: a pair of rotating bodies, a plurality of vibrating elements, and a plurality of transformers. The horn and the anvil are arranged on the pair of rotating bodies. The plurality of vibrating elements are coupled to the horn and transmit vibration energy to the horn. The plurality of transformers are mounted on the rotating body on which the horn is arranged, and feed drive voltage to each of the plurality of vibrating elements.

According to the lateral sealing device of the aspect described above, power is fed to the primary-side windings of the plurality of transformers via, e.g., a single bipolar slip ring, whereby power can be fed to all of the plurality of vibrating elements connected to the secondary side. Therefore, a low-cost lateral sealing device is obtained in which the number of poles of the slip ring is reduced.

A lateral sealing device of a packaging machine according to a tenth aspect of the present invention is the lateral sealing device of a packaging machine according to the ninth aspect of the present invention, wherein power is fed to the primary-side windings of the plurality of transformers via a slip ring.

According to the lateral sealing device of the aspect described above, power can be fed in a simple configuration from the non-rotating side to the primary-side windings of the plurality of rotating transformers.

A lateral sealing device of a packaging machine according to an eleventh aspect of the present invention is the lateral sealing device of a packaging machine according to the tenth aspect of the present invention, wherein the primary-side windings of the plurality of transformers are connected in series.

According to the lateral sealing device of the aspect described above, the primary-side windings of the plurality of transformers are connected in series. Therefore, the number of poles to which power is fed from the non-rotating side is two, and this configuration can be achieved with a single bipolar slip ring.

A lateral sealing device of a packaging machine according to a twelfth aspect of the present invention is the lateral sealing device of a packaging machine according to the tenth aspect of the present invention, wherein the slip ring is a mercury slip ring.

According to the lateral sealing device of the aspect described above, the mercury slip ring is more inexpensive and maintenance-free, is capable of being used in higher-speed rotations, and is easier to use than a brush-type slip ring.

Advantageous Effects of Invention

In the lateral sealing device of the present invention, the horn assembly is gripped on two sides, which are the forward and rearward sides in the direction of rotation thereof and secured to the rotating body by the securing member. Therefore, the space occupied by the securing member behind vibrating elements is small and an increase in the size of the device can be prevented.

BRIEF DESCRIPTION OF THE DRAWINGS

FIG. 6 is a perspective view of the first horn 51a mounted on the first rotating body 50a and the peripheral members thereof;

FIG. 8 is a perspective view of the transformer mounting part of the first rotating body 50a;

DESCRIPTION OF EMBODIMENTS

Embodiments of the present invention are described below with reference to the drawings. The embodiments below are specific examples of the present invention and impose no limitations on the technical range of the present invention.

(1) Configuration of the Packaging Machine 1

Figure 1:
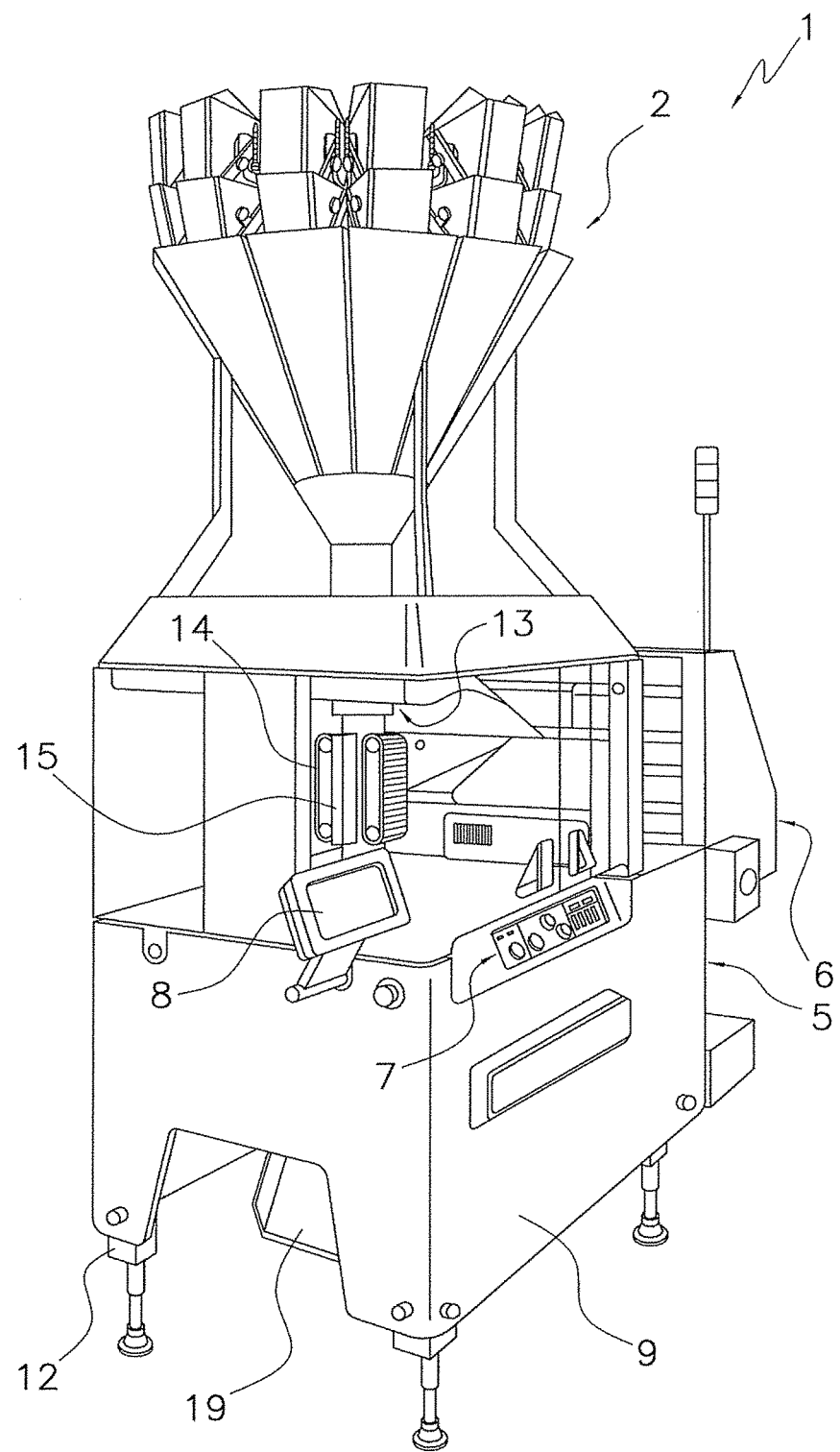
FIG. 1 is a perspective view of the packaging machine 1 according to an embodiment of the present invention.
Figure 2:
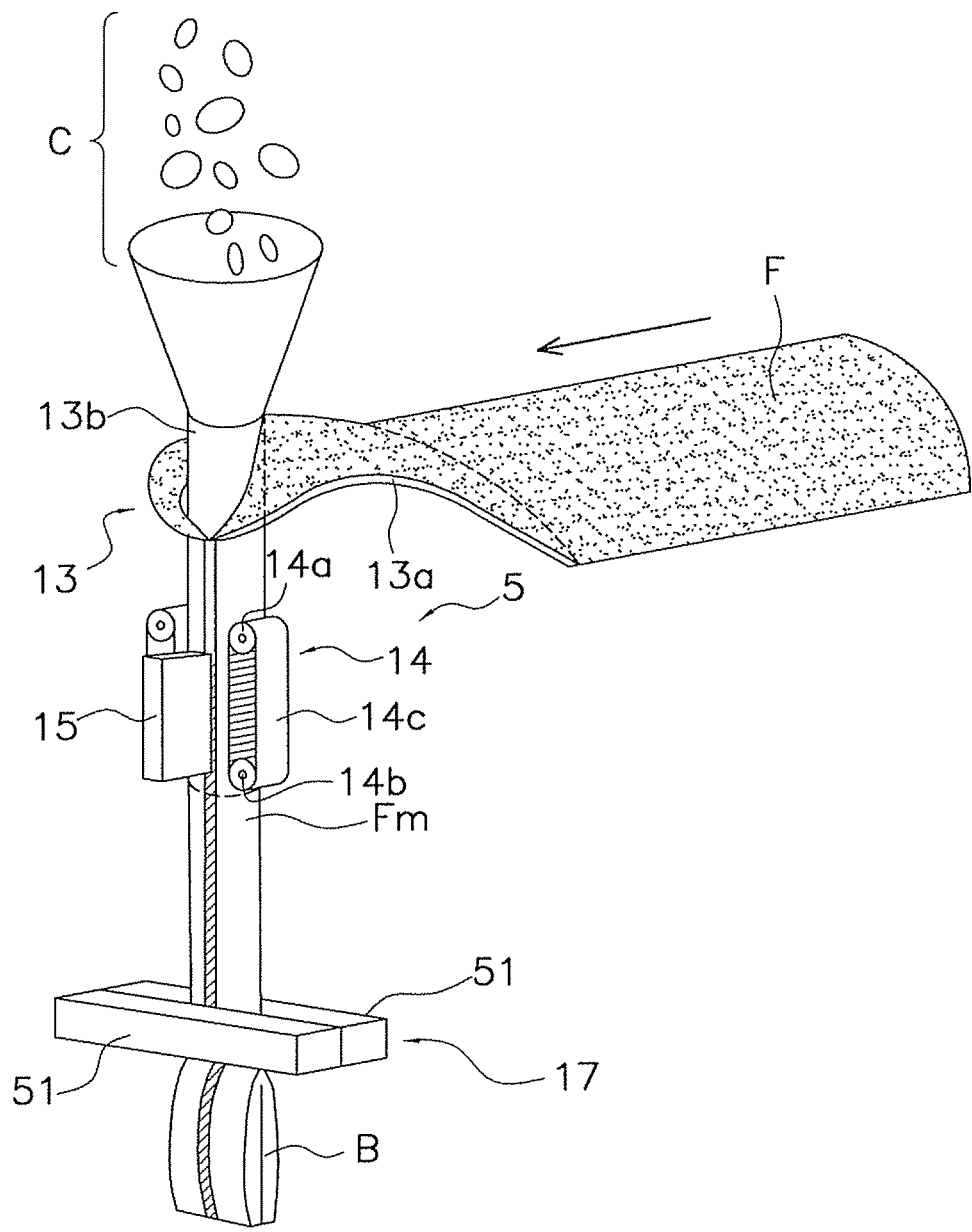
FIG. 2 is a perspective view showing a schematic configuration of the bag-making and packaging unit 5 of a packaging machine.

FIG. 1 a perspective view of the packaging machine 1 according to an embodiment of the present invention. FIG. 2 is a perspective view showing a schematic configuration of the bag-making and packaging unit 5 of a packaging machine. In FIGS. 1 to 2, the packaging machine 1 is provided with a combining and weighing unit 2, a bag-making and packaging unit 5, and a film-feeding unit 6.

The combining and weighing unit 2 weighs and discharges items to be packaged so as to achieve a predetermined total weight. The bag-making and packaging unit 5 is a main body portion for bagging items to be packaged. The film-feeding unit 6 feeds a film F that will constitute the bag to the bag-making and packaging unit 5.

Operation switches 7 are arranged on the front surface of the bag-making and packaging unit 5. A touch panel display 8 for showing the operating state is arranged in a position that can be viewed by a worker who operates the operation switches 7.

The combining and weighing unit 2, the bag-making and packaging unit 5, and the film-feeding unit 6 are controlled in accordance with operations and settings inputted from the operation switches 7 and/or the touch panel display 8. The operation switches 7 and/or the touch panel display 8 is connected to a controller (not shown) composed of a CPU, a ROM, a RAM, and the like, and the controller acquires required information from various sensors disposed in the combining and weighing unit 2 and the bag-making and packaging unit 5, and uses the information in various control procedures.

(2) Detailed Configuration (2-1) Combining and Weighing Unit 2

The combining and weighing unit 2 is arranged on an upper part of the bag-making and packaging unit 5. The combining and weighing unit weighs products C in a weighing hopper, and thereafter combines and sequentially discharges the products so that the weighed value of the products achieves a predetermined total weight.

(2-2) Film-Feeding Unit 6

The film-feeding unit 6 is a unit for feeding a sheet-shaped film F to a molding mechanism 13 of the bag-making and packaging unit 5, and is disposed adjacent to the bag-making and packaging unit 5. The roll on which the film F is wound is set in the film-feeding unit 6 and the film F is fed out from the roll.

(2-3) Bag-Making and Packaging Unit 5

The bag-making and packaging unit 5 is composed of the molding mechanism 13, a pull-down belt mechanism 14, a vertical sealing mechanism 15, a lateral sealing mechanism 17, and a lateral direction driving mechanism 55.

The molding mechanism 13 molds the film F fed in the form of a sheet into a cylindrical shape. The pull-down belt mechanism 14 downwardly conveys the film F formed into a cylindrical shape (hereinbelow referred to as a cylindrical film Fm). The vertical sealing mechanism 15 vertically seals the overlapping portions (the seam) of the cylindrical film Fm.

The lateral sealing mechanism 17 seals off the upper and lower ends by sealing the cylindrical film Fm in the lateral direction. The lateral direction driving mechanism 55 causes the lateral sealing mechanism 17 to move in a reciprocating fashion.

These mechanisms are supported by a support frame 12, and the periphery of the support frame 12 is covered by a casing 9.

(2-3-1) Molding Mechanism 13

The molding mechanism 13 has a tube 13b and a former 13a. The tube 13b is a cylindrical member, and the upper and lower ends are open. Products C weighed by the combining and weighing unit 2 are introduced to the opening part of the upper end of the tube 13b. The former 13a is arranged so as to surround the tube 13b. The sheet-shaped film F fed out from the film roll is molded into the form of a cylinder when the film passes between the former 13a and the tube 13b. The tube 13b and the former 13a of the molding mechanism 13 can be exchanged with a differently sized configuration to accommodate different types of products in accordance with the size of the bag to be manufactured.

(2-3-2) Pull-Down Belt Mechanism 14

The pull-down belt mechanism 14 is a mechanism for chucking and downwardly conveying in continuous fashion the cylindrical film Fm wound on the tube 13b, and has a belt 14c disposed on the left and right sides with the tube 13b therebetween, as shown in FIG. 2. In the pull-down belt mechanism 14, the belt 14c has a chucking function, and is caused to rotate by a drive roller 14a and a driven roller 14b to carry the cylindrical film Fm downward. In FIG. 2, the roller drive motor for driving the drive roller 14a and the like is omitted from the drawing for the sake of clarity.

(2-3-3) Vertical Sealing Mechanism 15

The vertical sealing mechanism 15 is a mechanism for ultrasonically sealing in the vertical direction the overlapping portions (seam) of the cylindrical film Fm wound around the tube 13b while the overlapping portions are pressed against the tube 13b with a constant pressure. The vertical sealing mechanism 15 is positioned on the front surface side of the tube 13b, and is also provided with a drive device (not shown) for moving the vertical sealing mechanism close to and away from the tube 13b.

(2-3-4) Lateral Sealing Mechanism 17

Figure 3:
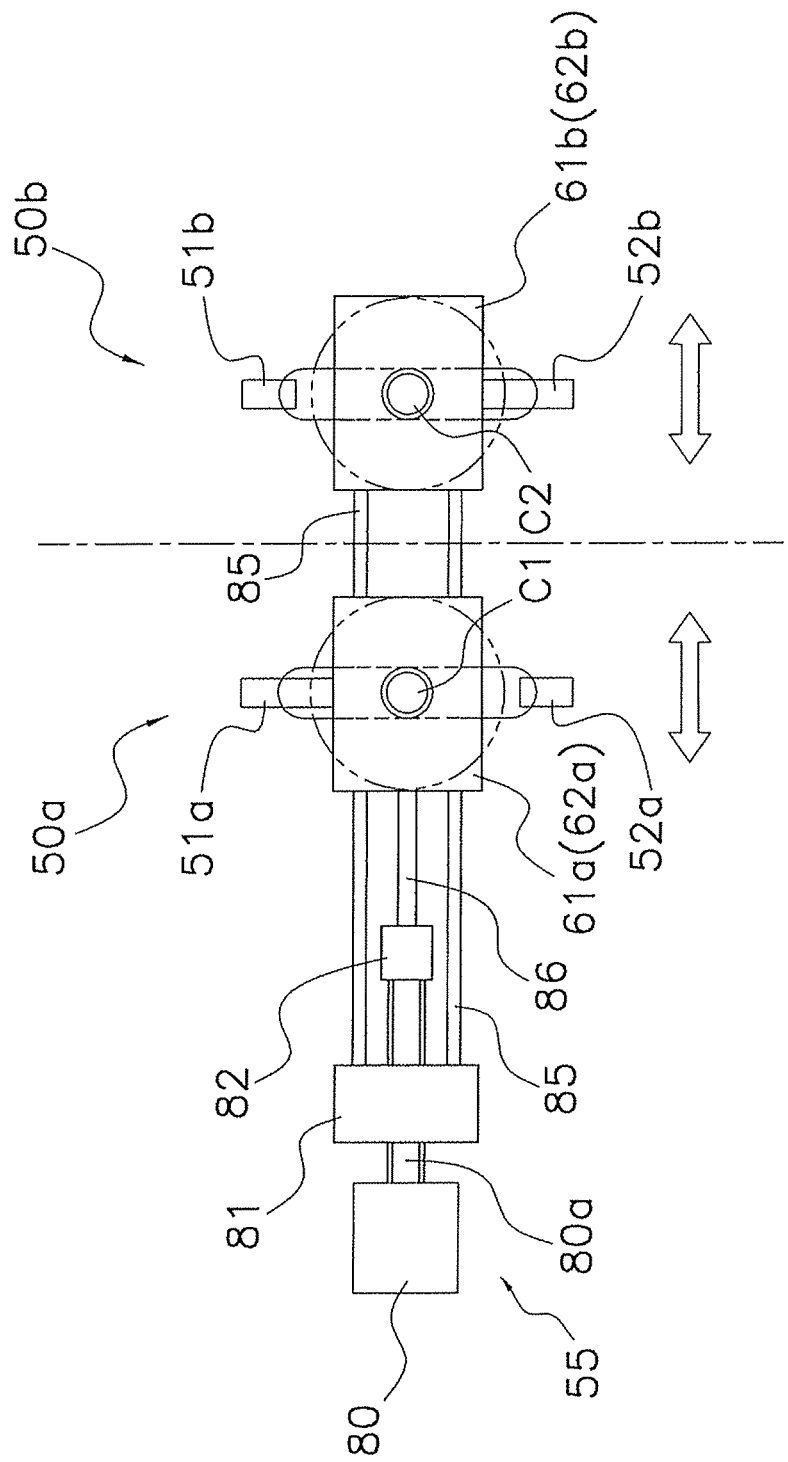
FIG. 3 is a side view of the lateral sealing mechanism 17.
Figure 4:
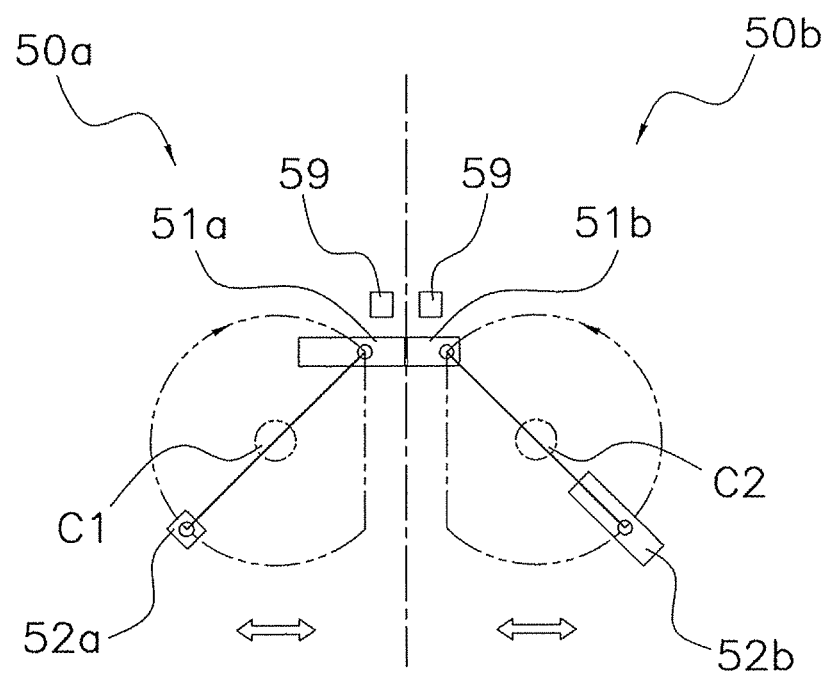
FIG. 4 is a side view of the trajectory of the horn and anvil.

FIG. 3 is a side view of the lateral sealing mechanism 17. FIG. 4 is a side view of the trajectory of the horn and the anvil. In FIG. 4, the lateral sealing mechanism 17 has a first rotating body 50a and a second rotating body 50b. The first rotating body 50a is the rotating body positioned to the left side of the cylindrical film Fm, and the second rotating body 50b is the rotating body positioned to the right side in FIG. 3.

A first horn 51a for ultrasonic sealing is mounted on the first rotating body 50a, a first anvil 51b for ultrasonic sealing is mounted on the second rotating body 50b, and the cylindrical film Fm is held therebetween while the first horn 51a and the first anvil 51b are spun in the shape of the letter D (e.g., see the trajectory of the horn and the anvil shown by the dotted lines in FIG. 4).

Three vibrating elements 511 (see FIG. 5) are coupled to the first horn 51a so as to line up along the sealing direction, the sealing surface of the first horn 51a is made to vibrate by the three vibrating elements 511, and a portion of the cylindrical film Fm held between the first horn 51a and the first anvil 51b is sealed.

A second anvil 52a is arranged in a position set at a distance 180° away from the first horn 51a about the axis of rotation of the first rotating body 50a, and a second horn 52b is arranged in a position set at a distance 180° away from the first anvil 51b about the axis of rotation of the second rotating body 50b.

Three vibrating elements 521 (see FIG. 5) are coupled to the second horn 52b so as to line up along the sealing direction, the sealing surface of the second horn 52b is made to vibrate by the three vibrating elements 521, and a portion of the cylindrical film Fm held between the second horn 52b and the second anvil 52a is sealed.

The number of the vibrating elements 511 and the vibrating elements 521 is not limited to three; it is possible to use two in the case that the widths of the first horn 51a and the second horn 52b are narrow.

Film detection sensors 59 are arranged in locations where the first horn 51a and the first anvil 51b are separately secured, as shown in FIG. 4. A photoelectric sensor, an ultrasonic sensor, or the like are used as the film detection sensors 59.

The film detection sensors 59 are not necessarily required to be arranged in a location secured separately from the first horn 51a and the first anvil 51b, and may be arranged on the first horn 51a side and the first anvil 51b side. In such a case, the film detection sensors 59 and receivers of the sensor signals thereof are mounted on the structure for supporting the first horn 51a and the structure for supporting the first anvil 51b, respectively.

The presence of the cylindrical film Fm is confirmed immediately prior to the operation for applying pressure in the sealing stage carried out by the first horn 51a and the first anvil 51b. When it has been determined that the cylindrical film Fm is not present from the sensor signals of the film detection sensors 59, an adjustment is made so that the spinning operation is carried out while a gap is maintained between the first horn 51a and the first anvil 51b. Therefore, a situation is avoided in which the first horn 51a and the first anvil 51b are damaged by contact with each other.

Although not shown in FIG. 4, the film detection sensors 59 and the receivers of the sensor signals thereof are mounted on the structure for supporting the second horn 52b and the structure for supporting the second anvil 52a, respectively; and a situation is avoided in which the second horn 52b and the second anvil 52a are damaged by contact with each other.

The first rotating body 50a and the second rotating body 50b are rotated about axes C1, C2 by a drive motor (not shown). In other words, the first horn 51a and the second anvil 52a rotate about the axis C1 and the first anvil 51b and the second horn 52b rotate about the axis C2.

In FIG. 3, the first rotating body 50a is supported by a first horizontal movement plate 61a, and the second rotating body 50b is supported by a second horizontal movement plate 61b. The first horizontal movement plate 61a and the second horizontal movement plate 61b are made to approach and move away from each other by the lateral direction driving mechanism 55 shown in FIG. 3. The lateral direction driving mechanism 55 has a ball screw 80a, a first nut 81, a second nut 82, a third coupling rod 85, and the fourth coupling rod 86.

The ball screw 80a is rotated by a servomotor 80 (see FIG. 3). The first nut 81 and the second nut 82 are threaded onto the ball screw 80a. A pair of the third coupling rods 85 is disposed along the movement direction of the first horizontal movement plate 61a and the second horizontal movement plate 61b. The fourth coupling rod 86 is disposed parallel to the third coupling rod 85.

The distal end of the third coupling rod 85 is secured to the side end face of the second horizontal movement plate 61b. The third coupling rod 85 slidably passes through the first horizontal movement plate 61a. The distal end of the fourth coupling rod 86 is secured to the side end face of the first horizontal movement plate 61a.

In the ball screw 80a, the portion on which the first nut 81 is threaded and the portion on which the second nut 82 is threaded have mutually inverse threading.

The ball screw 80a is rotated by the lateral direction driving mechanism 55 described above, whereby the first horizontal movement plate 61a and the second horizontal movement plate 61b can approach and move away from each other.

Another first horizontal movement plate 62a is disposed in a position set at a predetermined distance from the first horizontal movement plate 61a in the direction perpendicular to the plane of the drawing in FIG. 3, and has the same operation as that of the first horizontal movement plate 61a. Similarly, another second horizontal movement plate 62b is disposed in a position set at a predetermined distance from the second horizontal movement plate 61b in the direction perpendicular to the plan of the drawing in FIG. 3, and has the same operation as that of the second horizontal movement plate 61b.

(3) Detailed Configuration of the Lateral Sealing Mechanism 17

(3-1) First Rotating Body 50a and Second Rotating Body 50b

Figure 5:
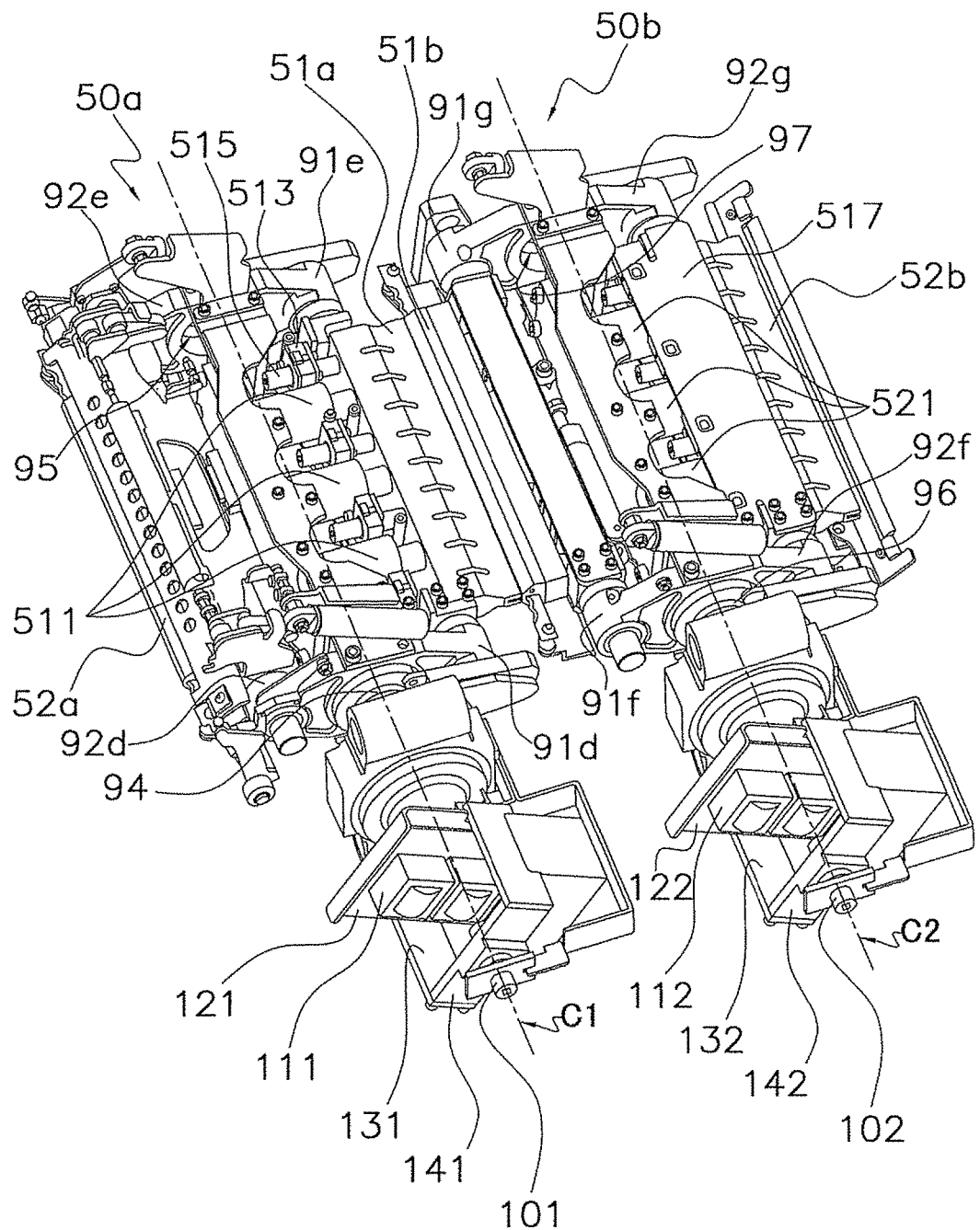
FIG. 5 is a perspective view of the first rotating body 50a and the second rotating body 50b.

FIG. 5 is a perspective view of the first rotating body 50a and the second rotating body 50b. In FIG. 5, the first rotating body 50a includes: a spinning shaft 94 and a spinning shaft 95 that rotate about the spin center C1 (an axis of rotation); a lever 91d and a lever 92d that are supported by the spinning shaft 94 so as to be capable of rotating relative to each other; and a lever 91e and a lever 92e that are supported by the spinning shaft 95 so as to be capable of rotating relative to each other.

One end of the first horn 51a is supported by the distal end of the lever 91d and the other end is supported by the distal end of the lever 91e; and the lever 91d and the lever 91e rotate together when rotating about the spin center C1.

Also, one end of the second anvil 52a is supported by the distal end of the lever 92d and the other end is supported by the distal end of the lever 92e; and the lever 92d and the lever 92e rotate together when rotating about the spin center C1.

The second rotating body 50b includes: a spinning shaft 96 and a spinning shaft 97 that rotate about the spin center C2 (another axis of rotation); a lever 91f and a lever 92f that are supported by the spinning shaft 96 so as to be capable of rotating relative to each other; and a lever 91g and a lever 92g that are supported by the spinning shaft 97 so as to be capable of rotating relative to each other.

One end of the first anvil 51b is supported by the distal end of the lever 91f and the other end is supported by the distal end of the lever 91g; and the lever 91f and the lever 91g rotate together when rotating about the spin center C2.

Also, one end of the second horn 52b is supported by the distal end of the lever 92f and the other end is supported by the distal end of the lever 92g; and the lever 92f and the lever 92g rotate together when rotating about the spin center C2.

The first horn 51a extends farther than the width dimension of the cylindrical film Fm, the three vibrating elements 511 are coupled so as to line up along the sealing direction, and the cylindrical film Fm held between the first horn 51a and the first anvil 51b is ultrasonically sealed by the vibrations of the first horn 51a.

The second horn 52b extends farther than the width dimension of the cylindrical film Fm, the three vibrating elements 521 are coupled so as to line up along the sealing direction, and the cylindrical film Fm held between the second horn 52b and the second anvil 52a is ultrasonically sealed by the vibrations of the second horn 52b.

The spinning shaft 94 is pivotably supported by the first horizontal movement plate 61a, the spinning shaft 95 is pivotably supported by the first horizontal movement plate 62a (the far side in FIG. 3), the spinning shaft 96 is pivotably supported by the second horizontal movement plate 61b, and the spinning shaft 97 is pivotably supported by the second horizontal movement plate 62b (the far side in FIG. 3). The first horizontal movement plates 61a, 62a are moved in the same manner as each other, and the second horizontal movement plates 61*b*, 62*b* are moved in the same manner as each other by the lateral direction driving mechanism 55 shown in FIG. 3.

(3-2) Mounting Structure of the First Horn 51*a* and the Second Horn 52*b*

FIG. 6 is a perspective view of the first horn 51*a* mounted on the first rotating body 50*a* and the peripheral members thereof. In FIG. 6, the first horn 51*a*, the three vibrating elements 511, and four columnar resonators 513 are assembled as a single unit. For convenience of description, this unit shall be referred to as a horn unit 51.

The three vibrating elements 511 are coupled so as to line up at equidistant intervals along the sealing direction behind the first horn 51*a*. The resonators 513 are coupled to the first horn 51*a* in adjacent positions so as to sandwich the vibrating elements 511 from two sides.

Figure 7:
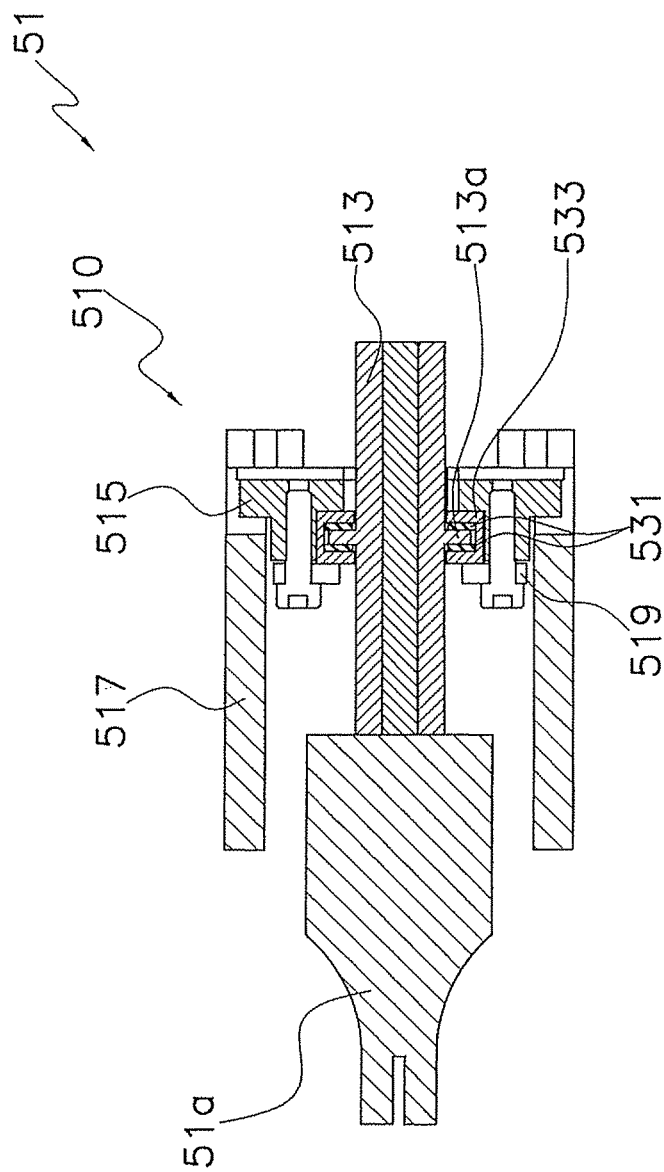
FIG. 7 is a cross-sectional view of the horn unit 51 along the major axis of the resonator 513.

FIG. 7 is a cross-sectional view of the horn unit 51 along the major axis of the resonator 513. In FIG. 7, a node of the ultrasonic vibrations is centrally positioned in the major axis direction of the resonators 513, and the vicinity of the node is held in place to secure the first rotating body 50*a*, whereby stable driving of the first horn 51*a* is achieved in the present embodiment.

Specifically, a flange 513*a* protrudes in the radial direction from the node position of the ultrasonic vibrations at the external periphery of the resonators 513, and the horn unit 51 is secured to the first rotating body 50*a* via the flange 513*a*.

The flange 513*a* is sandwiched from the side face directions by a packing 531. The flange 513*a* and the packing 531 are furthermore covered by a block 533. The external peripheral surface of the block 533 is held from above and below by a holding part 515. The holding part 515 faces one of the two side faces of the block 533, and a holding plate 519 faces the other of the two side faces. The holding part 515 and the holding plate 519 are held by a screw in place so as to sandwich the block 533 from both sides.

The holding part 515 is furthermore held by a screw to a securing part 517. The securing part 517 is a plate-shaped member, and the holding part 515 is held by a screw to the rear end of the securing part 517. The rear end of the securing part 517 is the end on the side far from the first horn 51*a*.

In the present embodiment, the flange 513*a* and the holding part 515 are coupled via the packing 531 and the block 533, but no limitation is imposed thereby. For example, it is also possible to use a configuration in which the external peripheral surface of the flange 513*a* is held from above and below by the holding part 515, the holding part 515 is made to face one of the two surfaces of the flange 513*a*, the holding plate 519 is made to face the other of the two surfaces, and the holding part 515 and the holding plate 519 are held in place by a screw so as to sandwich the flange 513*a* from two sides, without the interposition of the packing 531 and the block 533.

For convenience of description, the resonator 513, the holding part 515, and the securing part 517 shall together be referred to as a securing member 510. In FIG. 6 and the first rotating body 50*a* side of FIG. 5, the securing part 517 is dismounted from the securing member 510, and the specific shape can be seen by referring the second rotating body 50*b* side of FIG. 5.

The securing member 510 grips the horn unit 51 on two sides, which are the forward side and the reverse side of the direction of rotation thereof, in the vicinity of a node of the ultrasonic vibration to secure the first rotating body 50*a* and the second rotating body 50*b*, as shown in FIGS. 5 and 7.

Therefore, the space occupied by the securing member 510 behind the vibrating elements is reduced and an increase in the size of the device is minimized.

The length of the vibrating elements 511 is generally made to correspond to the wavelength used for causing the first horn 51*a* to vibrate and cannot therefore be arbitrarily varied. Therefore, the length of the vibrating elements 511 is increased in order to ensure the required power, and the size of the lateral sealing device tends to increase. The size of the device is even further increased in the particular case that the two pairs of horns and anvils sandwich the cylindrical film Fm in alternating fashion to carry out ultrasonic sealing with the aim of improving productivity (the speed of lateral sealing).

In the present embodiment, as described above, the second anvil 52*a* is arranged in a position set at a distance 180° away from the first horn 51*a* about the axis of rotation of the first rotating body 50*a*, and the second horn 52*b* is arranged in a position set at a distance 180° away from the first anvil 51*b* about the axis of rotation of the second rotating body 50*b*. As a result, a horn that occupies considerable space and an anvil that occupies a small space are arranged so as to allow for the mutually required space on a single rotating body. Therefore, a larger-sized device is prevented.

The first horn 51*a* and the first anvil 51*b*, or the second horn 52*b* and the second anvil 52*a* approach each other while being rotated, laterally seal the cylindrical film Fm by progressing in a rectilinear fashion from the position in which the cylindrical film Fm is sandwiched along the direction of spin while the cylindrical film Fm is sandwiched, and thereafter spin in a direction away from each other. This operation reliably carries out sealing because a constant sealing time is ensured.

The first horn 51*a* and the first anvil 51*b*, or the second horn 52*b* and the second anvil 52*a* change from a spinning movement to a rectilinear movement at the point at which the cylindrical film Fm begins to be sandwiched, and change from rectilinear movement to rotating movement at the point at which the horn and anvil move away from the cylindrical film Fm in a so-called D motion, as shown in FIG. 4.

In the first rotating body 50*a* of the present embodiment, one end of the first horn 51*a* is swingably supported by a pivoting mechanism at the distal end of the lever 91*d* and the other end is swingably supported at the distal end of the lever 91*e*. Also, one end of the second anvil 52*a* is swingably supported by a pivoting mechanism at the distal end of the lever 92*d* and the other end is swingably supported at the distal end of the lever 92*e*.

Similarly, in the second rotating body 50*b*, one end of the first anvil 51*b* is swingably supported by a pivoting mechanism at the distal end of the lever 91*f* and the other end is swingably supported at the distal end of the lever 91*g*. Also, one end of the second horn 52*b* is swingably supported by a pivoting mechanism at the distal end of the lever 92*f* and the other end is swingably supported at the distal end of the lever 92*g*.

As a result, the sealing surface of the first horn 51*a* and the first anvil 51*b* can be composed of a flat surface, and the sealing surface of the second horn 52*b* and the second anvil 52*a* can be composed of a flat surface.

The swinging of the first horn 51*a* and the second horn 52*b* is amplified at the rear end of the securing member 510, and space for allowing the swinging is ensured at the periphery of the first rotating body 50*a* and the second rotating body 50*b*. Therefore, interference with other locations is prevented.

(3-3) Power Supply Unit

A first slip ring 101 is disposed on the extended line of the spin center C1 of the first rotating body 50a. Also, a second slip ring 102 is disposed on the extended line of the spin center C2 of the second rotating body 50b.

The first slip ring 101 and the second slip ring 102 are electroconductive rotating rings for electrically connecting in sequential fashion between the rotating conductive body and the secured conductive body. The first slip ring 101 feeds power to the vibrating elements 511 that rotate together with the first rotating body 50a, and the second slip ring 102 feeds power to the vibrating elements 521 that rotate together with the second rotating body 50b.

In general, a slip ring that is compatible with a plurality of poles is required in order to feed power to the two poles of the vibrating elements in the case that power is fed to the plurality of vibrating elements via a slip ring. Bipolar-type mercury slip rings are low cost and maintenance free, and are compatible with high-withstand voltage and high-speed rotation. In the depicted embodiment, the slip rings 101 and 102 include two separate electric contact sections (indicated in FIG. 9) for bi-polar power transference.

In view of the above, in the present embodiment, three transformers 111 are mounted on the first rotating body 50a, and the transformer 111 is disposed between a single first slip ring 101 and each of the vibrating elements 511. The primary-side windings of the three transformers 111 are connected in series to form two poles, and power is fed thereto via the bipolar-type first slip ring 101. In the secondary side, the vibrating elements 511 are made to correspond to each winding, and independent drive voltage is fed to each winding.

Figure 8:
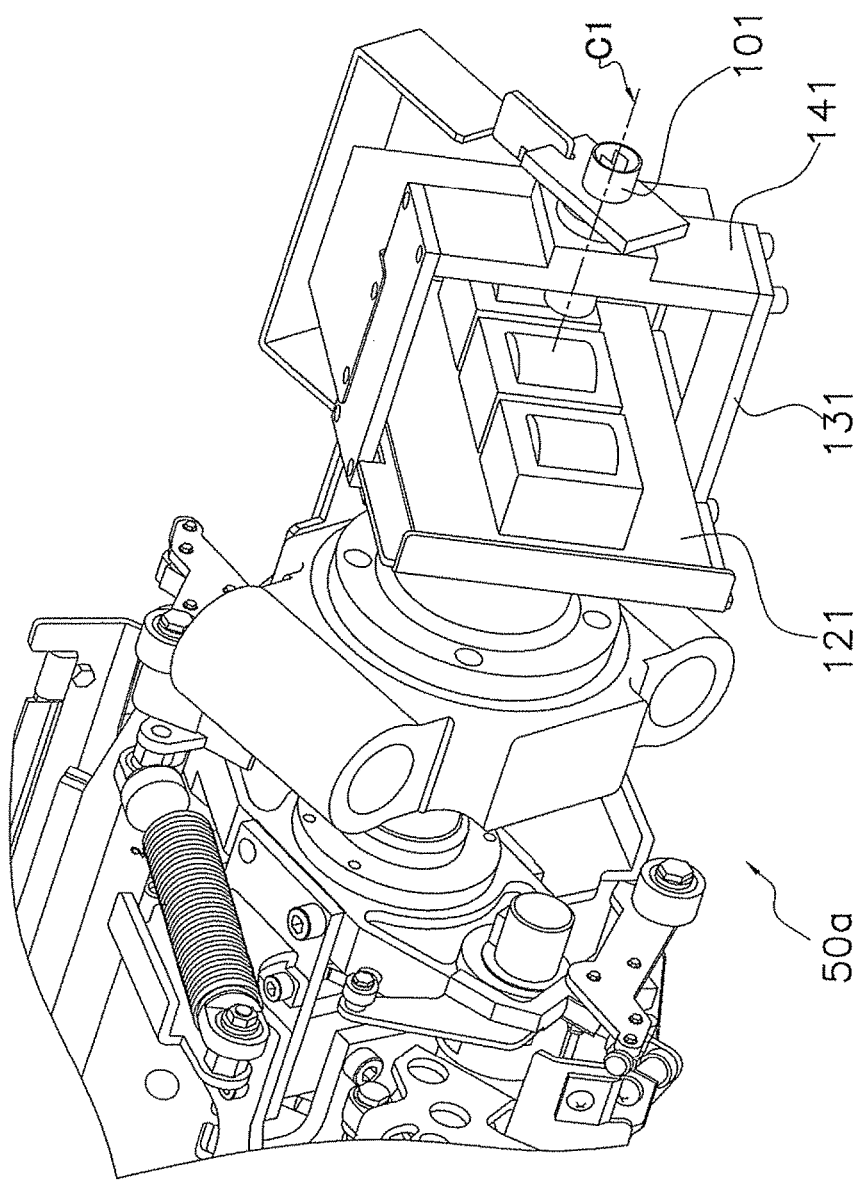

FIG. 8 is a perspective view of the transformer mounting part of the first rotating body 50a. In FIG. 8, the three transformers 111 are held by a plate-shaped transformer holder 121. Arms 131 extend parallel to the spin center C1 from the center of each of the long sides facing the transformer holder 121. The end parts of the two arms 131 are secured so as to sandwich a plate-shaped slip ring holder 141 from the both ends. A hole concentric with the spin center C1 is provided in advance to the slip ring holder 141, and the first slip ring 101 of this hole is held by the slip ring holder. In such a configuration, power is fed from the non-rotating side to the rotating three transformers 111 via the first slip ring 101.

The configuration of the second slip ring 102, three transformers 112, transformer holder 122, arms 132, and slip ring holder 142 of the second rotating body 50b side is the same as that of the first rotating body 50a side, and a description is therefore omitted.

Figure 9:
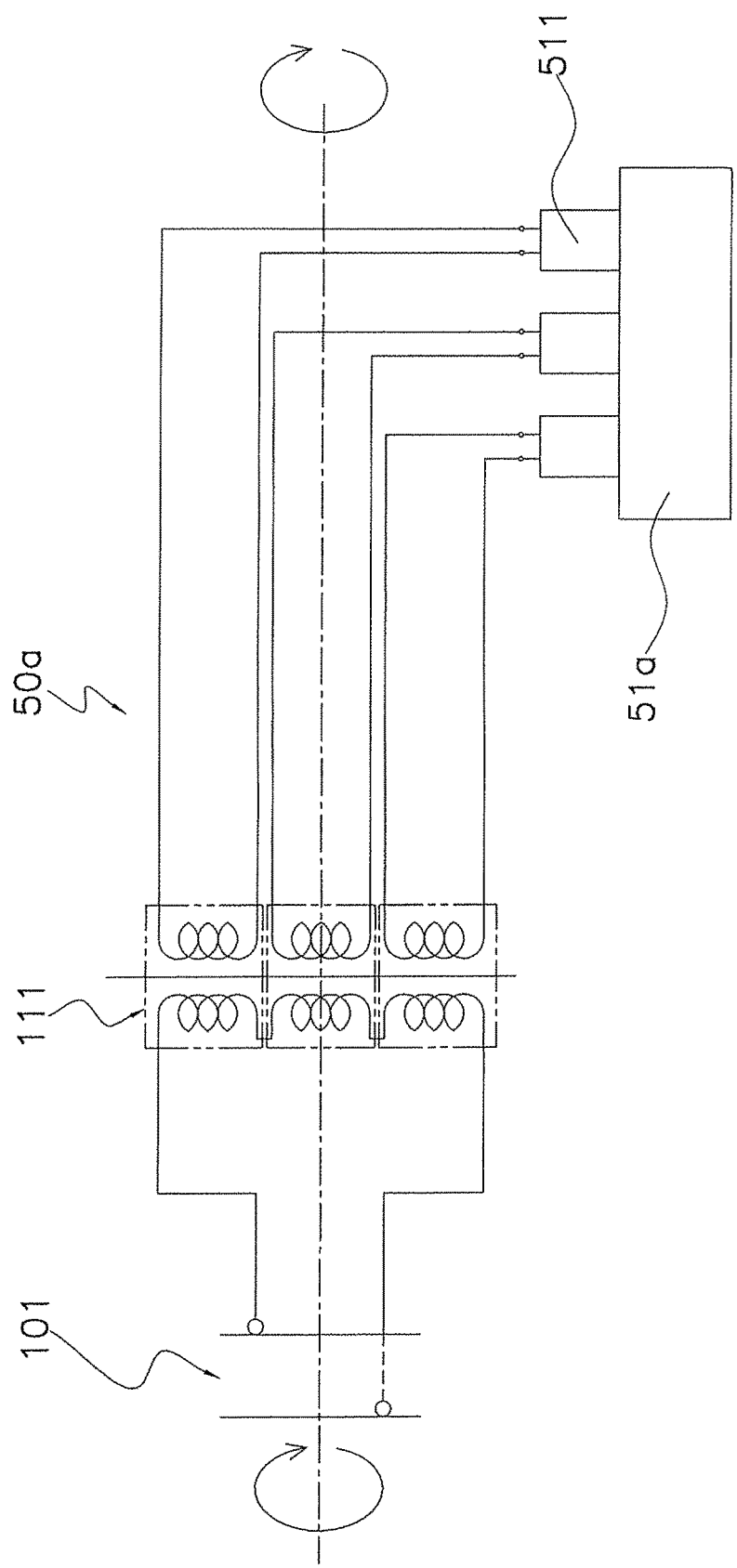
FIG. 9 is a schematic view of the state of electrical connections of the first slip ring 101, the three transformers 111, and the three vibrating elements 511 of the first rotating body 50a side.

FIG. 9 is a schematic view of the state of electrical connections of the first slip ring 101, the three transformers 111, and the three vibrating elements 511 of the first rotating body 50a side. The primary-side windings of the plurality of transformers 111 are connected in series, and the destination of the power fed from the non-rotating side is two poles, and a single bipolar slip ring, i.e., the first slip ring 101 is sufficient for the configuration, as shown in FIG. 8. The configuration of the second slip ring 102, the three transformers 112, and the three vibrating elements 521 of the second rotating body 50b side is the same as that of the first rotating body 50a side, and a description is therefore omitted.

(3-4) Cutting Mechanism

A cutting mechanism is composed of a cutter 72 disposed at the distal end part of the first anvil 51b and the second anvil 52a, and a slide groove 73 disposed in the first horn 51a and the second horn 52b. The cutter 72 is advanced toward the slide groove 73 by an air cylinder or other drive mechanism in conjunction with the timing for sealing the cylindrical film Fm. At this time, the cutter 72 is pressed into contact with substantially the center position in the width direction of the sealing portion, and the sealed portion is therefore cut. As a result, a single bag is divided away and discharged to a chute conveyor 19 (see FIG. 1).

(4) Operation of the Packaging Machine 1

The series of operations of the packaging machine 1 are described below. The items to be packaged (hereinafter referred to as products C) which have been weighed in the combining and weighing unit 2 are sequentially dropped into the upper opening end of the tube 13b. The external periphery of the tube 13b is then covered by the cylindrical film Fm for packaging the products C.

The products C pass through the tube 13b, and are discharged from the lower opening end of the tube 13b. Below the lower opening end, the first horn 51a and the first anvil 51b sandwich and laterally seal the cylindrical film Fm in advance, and the top part of the bag and the bottom part of the subsequent bag are formed.

The products C fill the cylindrical film Fm standing by with the bottom part sealed, the first horn 51a and the first anvil 51b sandwich and laterally seal the upper part, and the top part of the bag and the bottom part of the subsequent bag are formed. The center of the lateral sealing part is cut immediately after sealing to complete a bag filled with the products C.

(5) Characteristics (5-1)

In the lateral sealing mechanism 17, the cylindrical film Fm is sandwiched and ultrasonically sealed along a direction intersecting a conveying direction while the first horn 51a and the first anvil 51b, and the second horn 52b and the second anvil 52a are caused to spin. The first horn 51a is mounted on the first rotating body 50a in a state of being coupled to the plurality of vibrating elements 511. The second horn 52b is mounted on the second rotating body 50b in a state of being coupled to the plurality of vibrating elements 521. The securing member 510 grips the horn unit 51 on the forward and rearward sides in the direction of rotation of the horn unit 51 in the vicinity of the node of ultrasonic vibration and secures the horn unit 51, which includes the horns and the plurality of vibrating elements, to the first rotating body 50a and the second rotating body 50b, respectively. Therefore, the space occupied by the securing member 510 behind vibrating elements is small and an increase in the size of the device is prevented.

(5-2)

The securing member 510 has the resonator 513 adjacent to the two sides of each of the vibrating elements and coupled to the horns, the holding part 515 for holding the resonator 513, and the securing part 517 for securing the holding part 515. The flange 513a is disposed at the external periphery of the resonator 513, and the holding part 515 sandwiches and holds the flange 513a. The flange 513a and the holding part 515 are fastened together interposed by the packing 531.

(5-3)

The first horn 51a and the first anvil 51b, and the second horn 52b and the second anvil 52a approach each other while spinning, then progress in a rectilinear fashion from a position in which the packaging material is sandwiched along the direction of spin while the packaging material remains sandwiched to thereby laterally seal the packaging material, and thereafter spin in a direction away from each other. Therefore, a constant sealing time can be ensured and sealing can be reliably carried out.

(5-4)

In the first rotating body 50a, one end of the first horn 51a is swingably supported at the distal end of the lever 91d and the other end is swingably supported at the distal end of the lever 91e. Also, one end of the second anvil 52a is swingably supported at the distal end of the lever 92d and the other end is swingably supported at the distal end of the lever 92e. Similarly, in the second rotating body 50b, one end of the first anvil 51b is swingably supported at the distal end of the lever 91f and the other end is swingably supported at the distal end of the lever 91g. Also, one end of the second horn 52b is swingably supported at the distal end of the lever 92f and the other end is swingably supported at the distal end of the lever 92g. Therefore, the sealing surface of the first horn 51a and the first anvil 51b can be composed of a flat surface, and the sealing surface of the second horn 52b and the second anvil 52a can be composed of a flat surface.

(5-5)

The swinging of the first horn 51a and the second horn 52b is amplified at the rear end of the securing member 510, and space sufficient to allow the swinging thereof is ensured at the periphery of the first rotating body 50a and the second rotating body 50b. Therefore, interference with other locations is prevented.

(5-6)

A plurality of transformers 111 are mounted on the first rotating body 50a and drive voltage is fed to each of the plurality of vibrating elements 511. Similarly, a plurality of transformers 112 are mounted on the second rotating body 50b and drive voltage is fed to each of the plurality of vibrating elements 521

(5-7)

On the first rotating body 50a side, the primary-side windings of the plurality of transformers 111 are connected in series to form two poles to which power is to be fed from the non-rotating side, and this configuration can be achieved with a single bipolar first slip ring 101. Similarly, on the second rotating body 50b side, the primary-side windings of the plurality of transformers 112 are connected in series to form two poles to which power is to be fed from the non-rotating side, and this configuration can be achieved with a single bipolar second slip ring 102.

Accordingly, in the lateral sealing mechanism 17, power is fed to the primary-side windings of a plurality of transformers via a single bipolar slip ring, whereby power can be fed to all of the plurality of vibrating elements connected to the secondary side. Therefore, a low-cost lateral sealing device is obtained in which the number of poles of the slip ring is reduced.

(5-8)

The first slip ring 101 and the second slip ring 102 are mercury slip rings. Mercury slip rings are inexpensive and maintenance-free, are capable of being used in high-speed rotations, and are easier to use than a brush-type slip ring.

(6) Modifications

In the embodiments described above, the primary-side windings of the plurality of transformers 111 are connected in series, but no limitation is imposed thereby. Other connection examples are described below with reference to the drawings.

(6-1) First Modification

Figure 10:
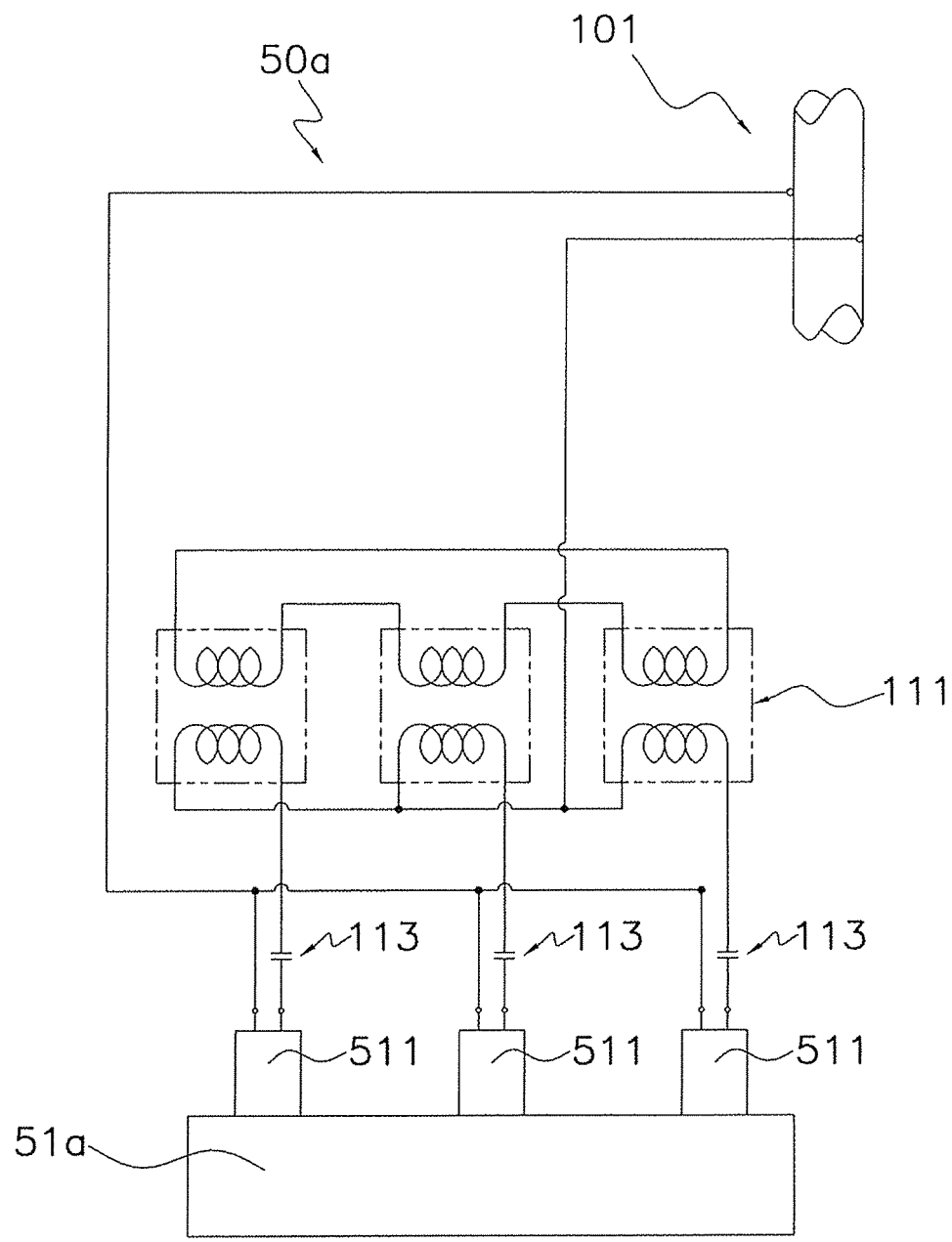
FIG. 10 is a schematic view of the state of electrical connections of the first slip ring 101, the three transformers 111, and the three vibrating elements 511 of the first rotating body 50a side of a first modification.

FIG. 10 is a schematic view of the state of electrical connections of the first slip ring 101, the three transformers 111, and the three vibrating elements 511 of the first rotating body 50a side of a first modification. In FIG. 10, a wire extending from one of the poles of the slip ring 101 branches at a midway point in parallel as three branched wires, and the primary-side windings of the transformers 111 and a capacitor 113 are connected in series between the branching point and one of input terminals of the vibrating elements 511. The secondary-side windings of each of the three transformers 111 are connected in series. The other input terminals of the vibrating elements 511 are connected to the other pole of the slip ring 101.

(6-2) Second Modification

Figure 11:
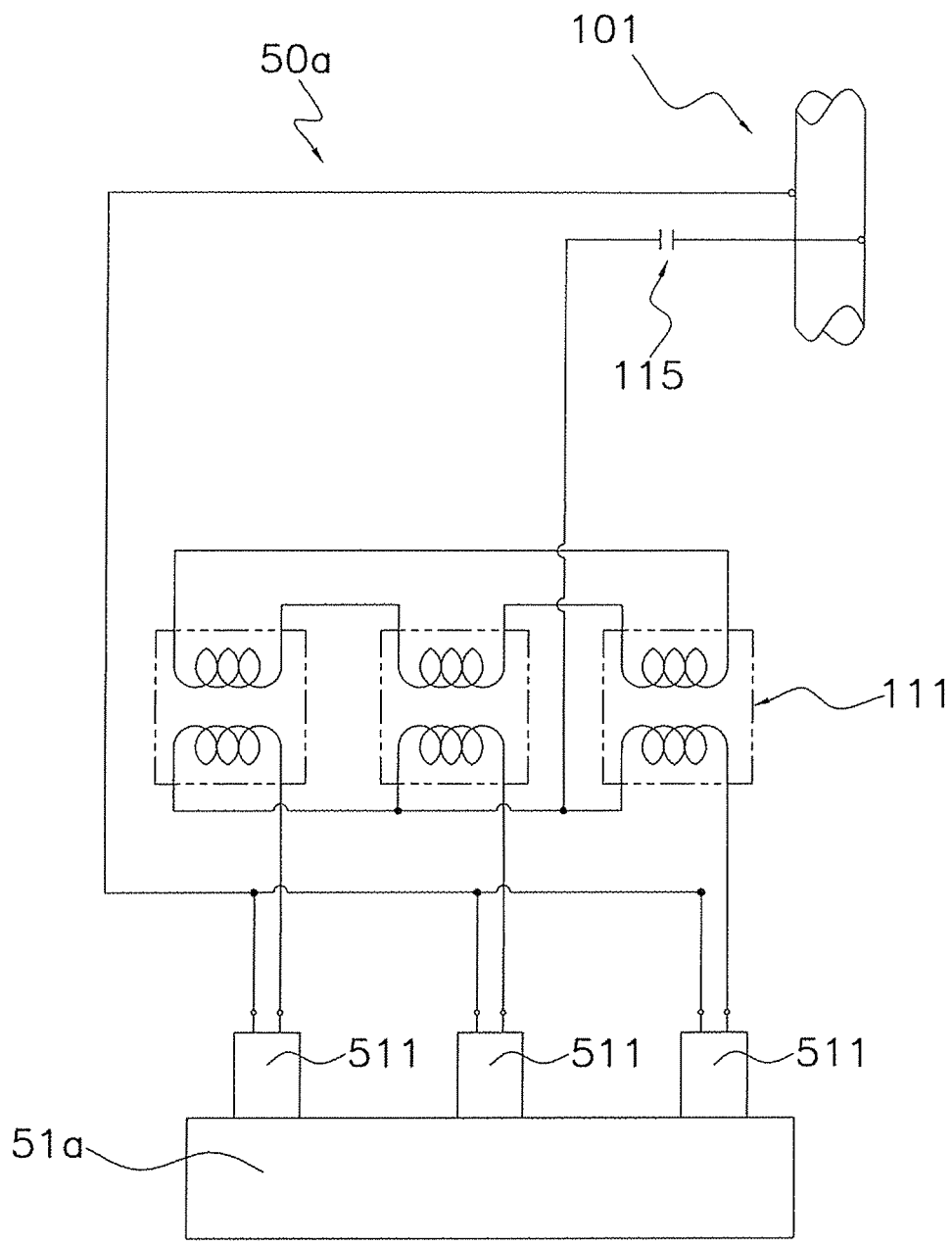
FIG. 11 is a schematic view of the state of electrical connections of the first slip ring 101, the three transformers 111, and the three vibrating elements 511 of the first rotating body 50a side of a second modification.

FIG. 11 is a schematic view of the state of electrical connections of the first slip ring 101, the three transformers 111, and the three vibrating elements 511 of the first rotating body 50a side of a second modification. In FIG. 11, a wire extending from one of the poles of the slip ring 101 branches at a midway point in parallel as three branched wires. A capacitor 115 is connected in series between the pole and the branching point. The primary-side windings of the transformers 111 are connected in series between the branching points and one of the input terminals of the vibrating elements 511. The second modification is otherwise the same as the first modification.

A difference from the first modification is that the three capacitors 113 in the first modification are substituted with a single capacitor 115 in the second modification. Therefore, the capacity of the capacitor 115 corresponds to triple the capacity of the capacitors 113. The capacitor 115 is disposed on the rotating side, but may be disposed on the non-rotating side.

(7) Other Embodiments

In the embodiments described above, the securing member 510 is arranged at the node on the side far from the sealing surface of the two nodes of an ultrasonic vibration of the horn unit 51, but no limitation is imposed thereby.

For example, the securing member 510 does not protrude rearward of the vibrating elements in the case that the securing member is arranged at the node on the side near the sealing surface, and there is therefore a merit in that the size of the device can be reduced.

INDUSTRIAL APPLICABILITY

The present invention described above is useful in reducing the size of a device that performs ultrasonic sealing while the horn and anvil spin.

The invention claimed is:

1. A lateral sealing device comprising:
 a packaging machine configured to move a packaging material in a conveying direction and form a package from the packaging material;
 a pair of rotating bodies that rotate about corresponding rotation shafts, the pair of rotating bodies being configured to sandwich and laterally seal the packaging material along the directions intersecting the conveying direction of the packaging material, each of the rotating bodies including a horn assembly and an anvil, the horn assembly including a horn, a resonator and a plurality of vibrating elements, each rotating body having a forward side and a reverse side relative to a direction of rotation about the corresponding rotation shafts; and
 a securing member gripping the horn assembly at the forward side and the reverse side thereof, and securing the horn assembly to the rotating bodies, the securing member also directly retaining a portion of the resonator at a location adjacent to at least one of the vibrating elements in a lateral sealing direction, with the portion of the resonator being secured to the securing member at a node of the ultrasonic vibration produced by the horn assembly, the node being located along a major axis of the portion of the resonator.

2. The lateral sealing device of a packaging machine according to claim 1, wherein the securing member includes:
a holding part for holding the portion of the resonator; and
a securing part for securing the holding part.

3. The lateral sealing device of a packaging machine according to claim 2, wherein
the portion of the resonator is a flange is provided to an external periphery of the resonator proximate the node of ultrasonic vibration; and
the holding part sandwiches and holds the flange.

4. The lateral sealing device of a packaging machine according to claim 3, wherein the flange and the holding part are fastened together interposed by a packing.

5. The lateral sealing device of a packaging machine according to claim 1, wherein
the ultrasonic vibration of the horn assembly defines a second node, and
the securing member is arranged proximate one of the node and the second node of the ultrasonic vibration of the horn assembly.

6. The lateral sealing device of a packaging machine according to claim 1, wherein
the horn and the anvil are mounted on the rotating body interposed by a swinging mechanism in which swinging at a predetermined angle is allowed ahead and behind in the direction of progress in an interval of rectilinear progression.

7. The lateral sealing device of a packaging machine according to claim 6, wherein
a rear end of the horn assembly is positioned further behind the rotation shaft of the rotating body; and
a space for allowing the swinging of the rear end of the horn that accompanies the swinging of the horn is provided to a periphery of the rear end of the horn assembly.

8. A lateral sealing device comprising:
a packaging machine configured to move a packaging material in a conveying direction and form a package from the packaging material;
a lateral direction driving mechanism coupled to the packaging machine;
a pair of rotating bodies that rotate about corresponding rotation shafts, the pair of rotating bodies being supported by the lateral direction driving mechanism such that the lateral direction driving mechanism moves the pair of rotating bodies and the corresponding rotation shafts laterally in directions intersecting with the conveying direction, respective ones of the pair of rotating bodies supporting a horn and an anvil;
a plurality of vibrating elements for transmitting vibration energy to the horn, the vibrating elements being coupled to the horn;
a plurality of transformers for feeding drive voltage to each of the plurality of vibrating elements, the transformers being mounted on the rotating body; and
a securing member gripping the horn at a forward side and a reverse side thereof, and securing the horn to one of the rotating bodies, the securing member also directly retaining a portion of the resonator at a location adjacent to at least one of the vibrating elements in a lateral sealing direction, with the portion of the resonator being secured to the securing member at a node of the ultrasonic vibration produced by the horn assembly, the node being located along a major axis of the portion of the resonator.

9. The lateral sealing device of a packaging machine according to claim 8, wherein power is fed to primary-side windings of the plurality of transformers via a slip ring.

10. The lateral sealing device of a packaging machine according to claim 9, wherein the primary-side windings of the plurality of transformers are connected in series.

11. The lateral sealing device of a packaging machine according to claim 9, wherein the slip ring is a mercury slip ring.

12. The lateral sealing device of a packaging machine according to claim 8, wherein
the portion of the resonator is a flange extending from the resonator, and
the securing member includes a holding part and a holding plate fixed to one another sandwiching the flange therebetween.

* * * * *